United States Patent [19]
Smith et al.

[11] Patent Number: 5,532,456
[45] Date of Patent: Jul. 2, 1996

[54] TEMPERATURE AND HUMIDITY CONTROLLABLE DOORLESS OVEN

[75] Inventors: Wayne W. Smith, Mt. Pleasant; Thomas J. Frick, Rosebush; Earl H. Moore, Blancharel, all of Mich.

[73] Assignee: The Delfield Company, Mt. Pleasant, Mich.

[21] Appl. No.: 397,852

[22] Filed: Mar. 2, 1995

[51] Int. Cl.⁶ ........................................ F27D 7/02
[52] U.S. Cl. ............................ 219/400; 219/401; 126/20; 126/21 A; 99/467; 99/474; 110/179
[58] Field of Search .................... 219/400, 401; 126/19 R, 20, 21 A, 190, 198; 99/451, 467, 474; 110/173 R, 179

[56] References Cited

U.S. PATENT DOCUMENTS

| | | |
|---|---|---|
| 3,780,794 | 12/1973 | Staub . |
| 4,013,869 | 3/1977 | Orts . |
| 4,038,968 | 8/1977 | Rovell . |
| 4,039,776 | 8/1977 | Roderick . |
| 4,089,322 | 5/1978 | Guibert ............................ 219/400 |
| 4,147,924 | 4/1979 | DeWitt, Jr. . |
| 4,281,636 | 8/1981 | Vegh et al. . |
| 4,377,109 | 3/1983 | Brown et al. . |
| 4,426,923 | 1/1984 | Ohata . |
| 4,617,908 | 10/1986 | Miller et al. . |
| 4,623,780 | 11/1986 | Shelton . |
| 4,635,540 | 1/1987 | Dowds . |
| 4,655,192 | 4/1987 | Jovanovic . |
| 4,772,268 | 9/1988 | Bates . |
| 4,995,313 | 2/1991 | Delau et al. . |
| 5,039,535 | 8/1991 | Lang et al. ........................ 426/233 |
| 5,203,258 | 4/1993 | Tippmann et al. . |
| 5,241,947 | 9/1993 | Sandolo . |
| 5,272,963 | 12/1993 | Del Fabbro . |

*Primary Examiner*—Philip H. Leung
*Attorney, Agent, or Firm*—Harness, Dickey & Pierce

[57] ABSTRACT

Disclosed is a temperature and humidity controllable doorless oven for cooking, warming and storing food products for extended periods of time. The oven includes a cabinet having interior walls and exterior walls which form an air duct between the walls. An interior oven chamber is formed within the interior walls with the cabinet providing an access opening into the interior oven chamber. A controllable heating element generates a warm environment inside the interior oven chamber and a humidifier generates a moist environment. To maintain the warm and moist environment inside the interior oven chamber, an air stream which forms an air curtain is moved through the air duct and across the access opening.

20 Claims, 2 Drawing Sheets

TEMPERATURE AND HUMIDITY CONTROLLABLE DOORLESS OVEN

BACKGROUND OF THE INVENTION

I. Field of the Invention

This invention relates generally to ovens and, more particularly, to a temperature and humidity controllable doorless oven.

II. Discussion of the Related Art

Various types of ovens are known and used in the food service industry today. These conventional ovens typically heat and/or warm food products in a sealed oven enclosure. Moreover, such ovens may be used to hold the food products in a warm condition for an extended period of time prior to subsequent use or consumption. However, storage of the food products in a warm environment in a conventional oven over an extended period of time, such as several hours, generally causes the food products to dry out and lose their freshness. This may ultimately result in the food products having to be discarded.

In order to eliminate this disadvantage, some sealed storage ovens provide both temperature and humidity control. This allows the food products to be kept both moist, as well as warm within the sealed storage oven. By keeping the food products both warm and moist, the food products can be maintained fresher over extended periods of time. However, use of such temperature and humidity controlled ovens also have several disadvantages in the food service industry.

For instance, in the fast food service industry, food products generally have to prepared quickly and repetitively. This results in having to open and close the oven door each time an item of food needs to be prepared or served. Such action allows the heat and moisture to escape from the oven, as well as slowing down the food preparation process. Moreover, because the oven also provides humidity or moisture to the interior environment of the oven, condensation can build up on the inside walls of the oven and door. Thus, upon opening the oven door, condensation on the inside of the door may drip off the door and into the food product or onto a food preparation counter, thereby resulting in potential contamination of the food products and possible health code violations. In addition, the condensation may fall on the floor, thereby possibly causing a hazardous work condition.

What is needed then, is an oven which does not suffer from the abovementioned disadvantages. This will, in turn, eliminate the drying out and waste of the food products, as well as eliminate the need to continuously open and close the oven door to gain access to the food products, thereby eliminating condensation from possibly falling into the food products or onto the floor. Moreover, such an oven would also decrease the food preparation time, while increasing food preparation efficiency. It is, therefore, an object of the present invention to provide such a temperature and humidity controllable doorless oven.

BRIEF DESCRIPTION OF THE DRAWINGS

Still other advantages of the present invention will become apparent to those skilled in the art after reading the following specification and by reference to the following drawings in which.

SUMMARY OF THE INVENTION

In accordance with the teachings of the present invention, a temperature and humidity controllable doorless oven for cooking, warming and storing food products for extended periods of time is disclosed. This is basically achieved by controlling the heat and humidity levels within an open access oven. In order to maintain the heated and moist environment within the oven, an air stream passes across the access opening of the oven to minimize the heated and moist environment from exiting the oven.

In one preferred embodiment, a cabinet having exterior walls and interior walls is utilized to form an air duct between the walls. Within the interior walls there is formed an interior oven chamber while the cabinet provides an access opening into this interior oven chamber. A controllable heating element is utilized to generate a warm environment inside the interior oven chamber and a humidifier is used to generate a moist environment inside the interior oven chamber. In order to minimize the heated and moist environment from exiting the interior oven chamber while also permitting easy access into the interior oven chamber, an air stream is passed through the air duct and across the access opening.

Use of the present invention provides a temperature and humidity controllable doorless oven to heat and maintain food products in a warm and moist environment for extended periods of time. As a result, the aforementioned disadvantages associated with the current ovens utilized in the food service industry have been substantially eliminated.

DETAILED DESCRIPTION OF THE PREFERRED EMBODIMENT

The following description of a temperature and humidity controllable doorless oven to cook, warm and hold food products for an extended period of time is merely exemplary in nature and is in no way intended to limit the invention or its application or uses. Moreover, those skilled in the art would readily recognize that while the present invention is discussed in detail with cooking and storing food products in a warm and moist environment, the present invention may also be used to warm and store numerous other products requiring a warm and moist environment.

Figure 1:
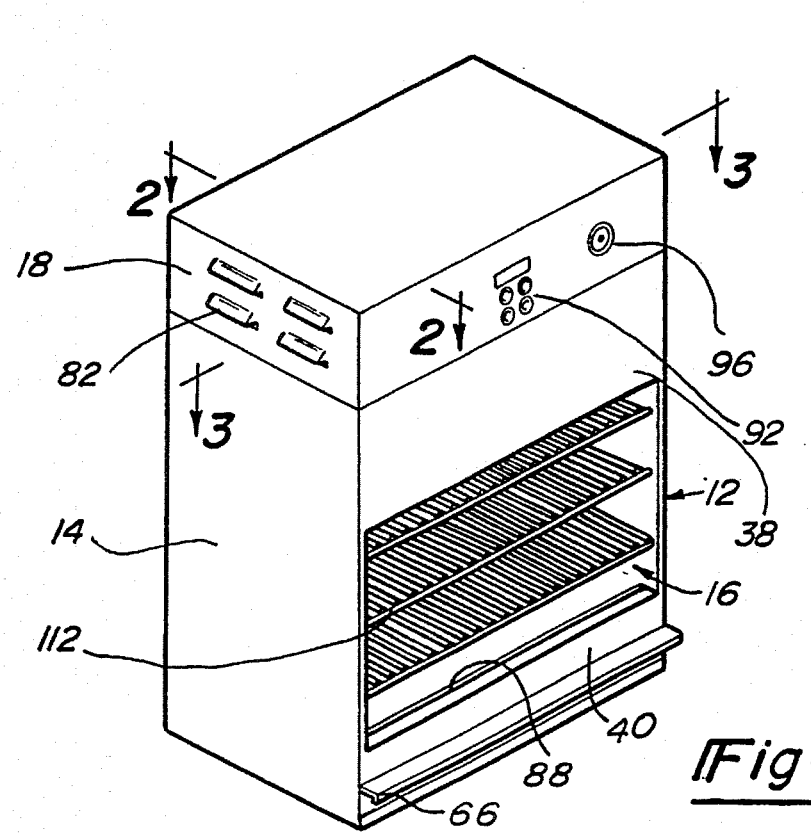
FIG. 1 is a perspective view of one preferred embodiment of the present invention.
Figure 2:
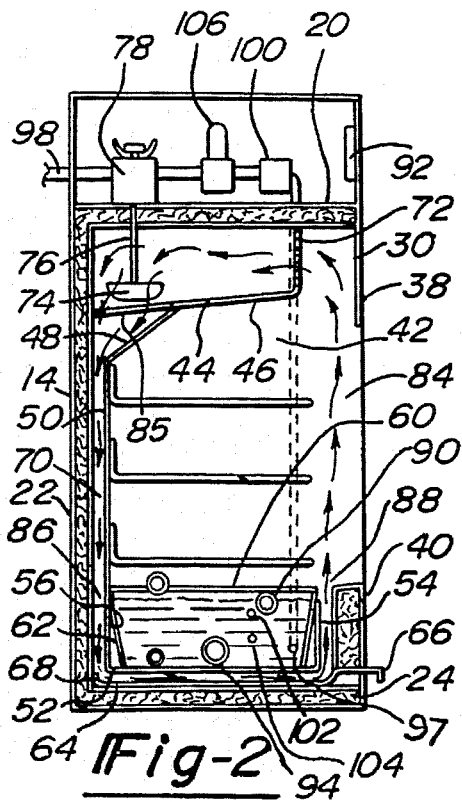
FIG. 2 is a side cross-sectional view of the embodiment in FIG. 1 taken along line 2—2 of FIG. 1.
Figure 3:
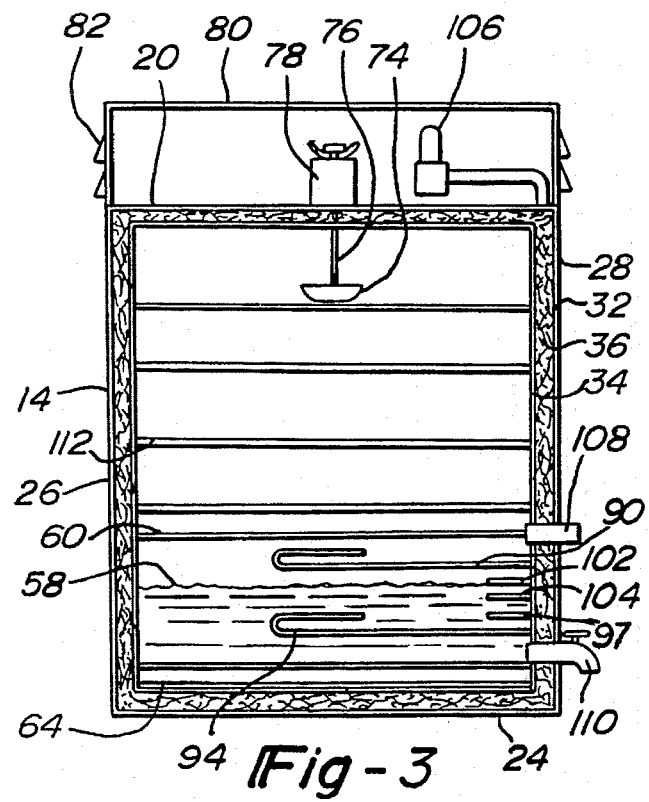
FIG. 3 is a front cross-sectional view of the embodiment in FIG. 1 taken along line 3—3 of FIG. 1.

Referring to FIG. 1, a perspective view of a temperature and humidity controllable doorless oven 10, is shown. The oven 10 is about thirty-two inches (32") high, twenty-four inches (24") wide and fifteen inches (15") deep. The oven 10 includes a cabinet 12 having exterior walls 14, an access opening 16 and an air generating portion 18 used to generate an air stream, not shown in FIG. 1. The access opening 16 is about nineteen inches (19") wide and about fourteen inches (14") high. The exterior walls 14, shown clearly in FIGS. 2 and 3, includes a top exterior wall 20, a rear exterior wall 22, a bottom exterior wall 24, a first side exterior wall 26, a second side exterior wall 28 and a front exterior wall 30.

The exterior walls 20–28 include a first layer 32, a second layer 34 having insulation 36 therebetween. The first layer 32 and the second layer 34 are preferably constructed of a corrosion resistant material such as stainless steel, however one skilled in the art would recognize that the layers 32 and 34 could also be made of galvanized steel or various types of plastic. The insulation 36 is preferably about one inch (1") thick and made of a ceramic fiber, however, the insulation 36 could also be made of fiberglass or form enclosed polyurethane.

The front exterior wall 30 has an upper portion 38 which is bounded by the top of the access opening 16 and a lower portion 40 bounded by the bottom of the access opening 16. The upper portion 38 only includes the first layer 32 and the lower portion 40 includes both the first layer 32 and the second layer 34 with the insulation 36 therebetween. It should be noted that the insulation 36 in the lower portion 40 is about one and a half inches (1.5") thick in order to provide a more directional air steam, as will be discussed shortly.

An interior oven chamber 42 is formed by interior walls 44. The interior walls 44 includes a top interior wall 46 having an angled portion 48, a rear interior wall 50, a bottom interior wall 52 and a front interior wall 54. The interior walls 46–54 are preferably made of stainless steel. A tank 56 is formed by the bottom interior wall 52, the front interior wall 54 and a portion of the rear interior wall 50 for containing water 58. A screened cover 60 constructed of stainless steel and having legs 62 covers the tank 56 to inhibit objects from falling into the tank 56.

Positioned beneath the bottom interior wall 52 and atop the bottom exterior wall 24 is a clean-out tray 64. The clean-out tray 64 includes a handle 66 which allows the tray 64 to be slidably removed at the lower portion 40 of the front exterior wall 30. The tray 64 catches food particles and debris and enables the bottom of the cabinet 12 to be easily cleaned out. The tray 64 has a curved rim 68 and is also constructed of stainless steel.

The top exterior wall 20, the rear exterior wall 22, the bottom exterior wall 24 and the front exterior wall 30 are positioned adjacent the top interior wall 46, the rear interior wall 50, the bottom interior wall 52 and the front interior wall 54 to form an air duct 70. The air duct 70 has a screened air intake opening 72 which provides an opening of about four inches (4") wide. Within the top of the four inch (4") air duct 70 there is a fan 74 mounted to a shaft 76 which is turned by a motor 78. The fan 74 is preferably a four (4) peddle fan having a diameter of about three and a half inches (3.5") and the motor 78 is preferably a C-frame type AC motor. The motor 78 is positioned atop the top exterior wall 20 and covered by a removable stainless steel cover 80. The cover 80 includes louvers 82 which allows the motor 78 to be cooled by air passing through the louvers 82.

As the fan 74 is turned at about 2600 RPMs, air is drawn into the intake opening 72 to generate an air stream 84. The air stream 84 is directed and funneled along angled portion 48 through an orfice 85 having a diameter of about four and a half inches (4.5") and into a portion 86 of the air duct 70 which is about one inch (1") wide. This narrowing of the air duct 70 reduces turbulence in the air stream 84 and increases its velocity. As the air stream 84 continues along the one inch (1") portion 86, the air stream 84 passes over the tray 64 with the rim 68 providing a curved corner to maintain the proper air stream 84 and reduce turbulence. The air stream 84 exits out a slot orifice 88 which is about 0.375 inches (0.375") wide which evens out the air stream 84 and further increases its velocity. As the air stream or air curtain 84 passes across the access opening 16, the flow of the air steam 84 widens and dissipates until the air stream 84 is drawn back into the wide air intake opening 72.

The interior oven chamber 42 is controllably heated with a heater 90 via a heater control 92. The heater 90 is preferably a 208 volt, 750 watt immersion resistance heating element and the heater control 92 is preferably a National Controls Corporation temperature control unit, model no. TNC-TC410-010. The interior oven chamber 42 can be controllable heated to between about 140° F. to about 165° F. using the heater 90 and the heater control 92. It should also be noted that the heater 90 is shown positioned above the water 58, however, the heater 90 can also function if the water level rises and comes in contact with the heater 90.

The interior oven chamber 42 is also humidified using a heater 94 submerged in the water 58 within the tank 56. The heater 94 is preferably a 208 volt, 3500 watt immersion resistance heating element positioned at the bottom of the pan 56. To control the humidity inside the oven chamber 42, a potentiometer 96 is used which allows the humidity to be controlled between about 50 to 100 percent relative humidity (RH) independent of the temperature inside the oven chamber 42. In addition, a closed loop humidity controller such as Vaisala HMP135Y could also be used in place of the potentiometer 96 to provide even more humidity control.

The water 58 enters the tank 56 generally below the water level via a water inlet 97. The water 58 is supplied from a copper conduit 98 and passes through a standard vacuum breaker 100 which is preferable manufactured by Watts. The water level is maintained substantially constant using a high level prob 102 and a low level probe 104 connected to a water level controller (not shown) which controls a solenoid valve 106. The water level controller which includes the level probes 102 and 104 is preferably a National Controls Corporation water level controller, model no. CNC-NS211-120. In addition, an overflow outlet 108 and a drain 110 are also provided for ensuring an overflow of the tank 56 does not occur inside the oven chamber 42, as well as to drain the tank 56 for cleaning.

In operation, food items (not shown) are placed on adjustable stainless steel shelves 112. The temperature and humidity is then independently adjusted by heater controls 92 and potentiometer 96 to achieve the optimum combination of a warm and moist environment inside the interior oven chamber 42. This optimum environment combination will provide the most flavorful and workable food cooking and storage condition, as well as preserve these conditions for extended storage periods. The air stream or air screen 84 which has a different heat and moisture environment than the interior oven chamber 42 minimizes the warm and moist environment from exiting the interior oven chamber 42 by forming an air curtain across the access opening 16 while at the same time allowing easy and unobstructed physical access to the food products. It should be noted that the heat and moisture environment of the air stream 84 is not controlled like the interior oven chamber 42 and merely consists of a combination of the interior environment and the environment outside the oven chamber 42.

Figure 4:
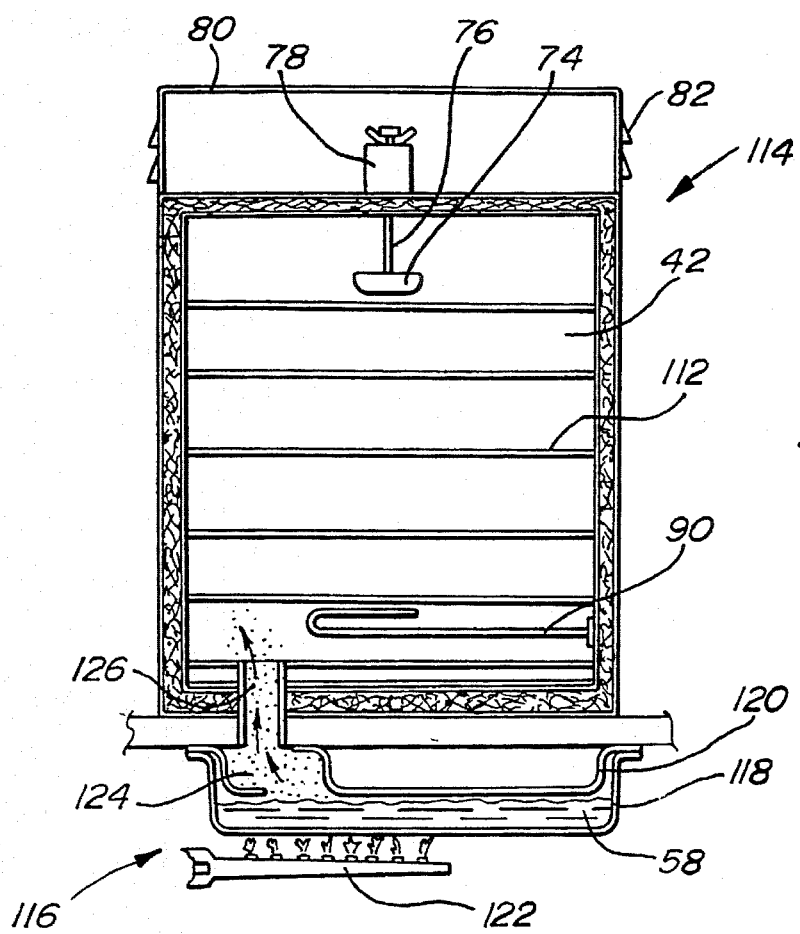
FIG. 4 is a front cross-sectional view of another preferred embodiment of the present invention.

Turning to FIG. 4, a front cross-sectional view of another preferred embodiment of a temperature and humidity controllable doorless oven 114, is shown. The oven 114 is similar to oven 10 except that an alternative source of moisture is used to humidify the interior oven chamber 42. In this embodiment, moisture is supplied from a steam table 116. The steam table 116 includes a steam tray 118 which contains water 58 and a food storage pan 120. The water 58 is heated by a burner 122 or a resistence heating element similar to heating element 94 to produce steam 124 which is delivered through a steam duct 126. To control the humidity level inside the oven chamber 42, a valve (not shown) can be used to open and close the steam duct 126 or in the alternative, the steam duct 126 can remain always open to produce a humidity of about 100 percent relative humidity (RH). This embodiment eliminates the need to store water 58 in the bottom of the oven chamber 42, the heater 94 and the associated water control items.

Figure 5:
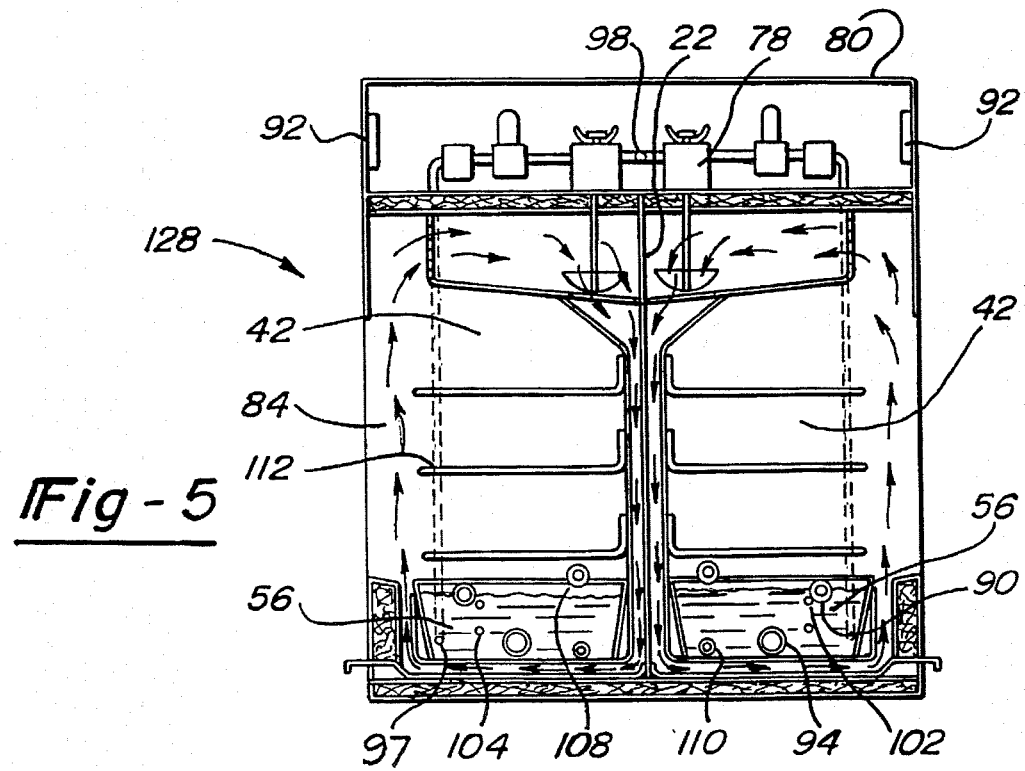
FIG. 5 is a side cross-sectional view of another preferred embodiment of the present invention implemented with two access openings.

Turning to FIG. 5, a side cross-sectional view of another preferred embodiment of a temperature and humidity controllable doorless oven 128, is shown. The oven 128 is essentially the same as the oven 10, except that it comprises two (2) separate oven chambers 42 which are back to back of one another. Because of this configuration, the rear exterior wall 22 only includes the first layer 32 and eliminates the second layer 34, as well as the insulation 36. In addition, the oven 128 has separate heater controls 92 and potentiometers 96 so that each oven chamber 42 can be independently controlled. The water 58 for the oven 128 is supplied via a single copper conduit 98 and splits off to supply each tank 56 independently. The oven 128 allows food items to be heated and removed from both sides of the oven 128, as well as provide additional food storage area.

The foregoing discussion discloses and describes merely exemplary embodiments of the present invention which has been constructed to meet all National Sanitation Foundation (NSF) requirements. One skilled in the art would readily recognize from such discussion, and from the accompanying drawings and claims, that various changes, modifications and variations can be made therein without departing from the spirit and scope of the invention as defined by the following claims.

What is claimed is:

1. A temperature and humidity controllable doorless oven comprising:

a cabinet having exterior walls and interior walls defining an air duct therebetween, said interior walls also defining an interior oven chamber, said cabinet having an access opening into said interior oven chamber;

controllable heating means for heating said interior oven chamber to generate a controlled warm environment inside said interior oven chamber;

controllable humidifying means for humidifying said interior oven chamber to generate a controlled moist environment inside said interior oven chamber which combines with said controlled warm environment to form a controlled combination of said controlled warm and moist environments; and air circulating means for moving an air stream having an uncontrolled combination of a warm and a moist environment through said air duct and across said access opening to minimize the flow of said controlled combination of said controlled warm and moist environments from said interior oven chamber through said access opening while permitting relatively uninhibited physical access into said interior oven chamber.

2. The temperature and humidity controllable doorless oven as defined in claim 1 wherein said exterior walls includes a top exterior wall, a rear exterior wall, a bottom exterior wall, a front exterior wall, a first side exterior wall and a second side exterior wall, and said interior walls includes a top interior wall, a rear interior wall, a bottom interior wall and a front interior wall.

3. The temperature and humidity controllable doorless oven as defined in claim 2 wherein said air duct is formed between said top exterior, rear exterior, bottom exterior and front exterior walls and said top interior, rear interior, bottom interior and front interior walls.

4. The temperature and humidity controllable doorless oven as defined in claim 3 wherein said air duct includes a screened air intake opening that narrows to reduce turbulence in the air stream and increase velocity and a narrow slot orifice to direct said air stream across said access opening.

5. The temperature and humidity controllable doorless oven as defined in claim 1 wherein said exterior walls includes a first stainless steel layer and a second stainless steel layer with a layer of insulation therebetween and said interior walls are constructed of stainless steel.

6. The temperature and humidity controllable doorless oven as defined in claim 1 wherein said controllable heating means includes a resistance heating element and a heater control to controllable heat the interior oven chamber to between about 140° F. to about 165° F.

7. The temperature and humidity controllable doorless oven as defined in claim 1 wherein said controllable humidifying means includes a tank for holding water, a resistance heating element positioned in the tank and control means for controllably humidifying the interior oven chamber to between about 50 to about 100 percent relative humidity (RH).

8. The temperature and humidity controllable doorless oven as defined in claim 7 wherein said controllable humidifying means further includes a water level control means for controlling the level of the water in said tank.

9. The temperature and humidity controllable doorless oven as defined in claim 1 wherein said controllable humidifying means includes a steam table to produce steam and a steam duct to direct said steam into said interior oven chamber.

10. The temperature and humidity controllable doorless oven as defined in claim 1 wherein said controllable heating means and said controllable humidifying means are operable to be controlled independently.

11. The temperature and humidity controllable doorless oven as defined in claim 1 wherein said air circulating means includes a fan mounted to a shaft which is turned by a motor, said fan operable to generate said air stream.

12. The temperature and humidity controllable doorless oven as defined in claim 1 wherein said cabinet includes a plurality of shelves positioned within the interior oven chamber.

13. A temperature and humidity controllable doorless oven comprising:

a cabinet having a first interior oven chamber and a second interior oven chamber, said cabinet having a first access opening into said first interior oven chamber and a second access opening into said second interior oven chamber;

heating means for independently heating said first interior oven chamber and said second interior oven chamber to generate a first controlled warm environment inside said first interior oven chamber and a second controlled warm environment inside said second interior oven chamber;

humidifying means for independently humidifying said first interior oven chamber and said second interior oven chamber to generate a first controlled moist environment inside said first interior oven chamber and a second controlled moist environment inside said second interior oven chamber, said first controlled warm environment combining with said first controlled moist environment to form a first controlled combination of said first controlled warm and moist environments and said second controlled warm environment combining with said second controlled moist environment to form a second controlled combination of said second controlled warm and moist environments; and air circulating means for generating a first air stream having a first uncontrolled combination of a warm and a moist environment and a second independent air stream having a second uncontrolled combination of a Warm and a moist environment, said air circulating means operable to pass said first air stream across said first access opening and said second independent air stream across said second access opening to minimize the flow of said first controlled combination of said controlled warm and moist environments from said first interior oven chamber through said first access opening and to minimize the flow of said second controlled combination of said second controlled warm and moist environments from said second interior oven chamber through said second access opening while permitting easy access into said first and second interior oven chambers.

14. The temperature and humidity controllable doorless oven as defined in claim 13 wherein said heating means includes a first resistance heating element and a first heater control to controllable heat the first interior oven chamber to between about 140° F. to about 165° F. and a second resistance heating element and a second heater control to controllable heat the second interior oven chamber to between about 140° F. to about 165° F.

15. The temperature and humidity controllable doorless oven as defined in claim 13 wherein said humidifying means includes a first tank for holding water, a first resistance heating element positioned in the first tank and first control means for controllable humidifying the first interior oven chamber to between about 50 to about 100 percent relative humidity (RH) and a second tank for holding water, a second resistance heating element positioned in the second tank and second control means for controllable humidifying the second interior oven chamber to between about 50 to about 100 percent relative humidity (RH).

16. The temperature and humidity controllable doorless oven as defined in claim 13 wherein said air circulating means includes a first air duct for passing said first air stream through and a second air duct for passing said second air stream through.

17. A method of providing a controlled warm and a controlled moist environment for cooking and storing food products for an extended period of time which is easily accessible, said method comprising the steps of:

providing a cabinet having an interior oven chamber and an unencumbered access opening into said interior oven chamber;

placing food products into said interior oven chamber;

controllably heating said interior oven chamber to generate a controlled warm environment inside said interior oven chamber;

controllably humidifying said interior oven chamber to generate a controlled moist environment inside said interior oven chamber which combines with said controlled warm environment to form a controlled combination of said controlled warm and moist environments;

generating an air stream having an uncontrolled warm and moist environment and moving said air stream having said uncontrolled warm and moist environment across said access opening to minimize said controlled combination of said controlled warm and moist environments from exiting said interior oven chamber; and removing said food products from said interior oven chamber through said unencumbered access opening.

18. The method as defined in claim 17 wherein the step of controllably heating said interior oven chamber further includes the steps of:

providing a resistance heating element and a heater control; and controllable heating said interior oven chamber with said heating element and said heater control to between about 140° F. to about 165° F. independent of generating said air stream.

19. The method as defined in claim 17 wherein the step of controllably humidifying said interior oven chamber further includes the steps of:

providing a tank for holding water;

positioning a resistance heating element in the tank; and controllably humidifying said interior oven chamber with said tank and said heating element to between about 50 to about 100 percent relative humidity (RH) independent of generating said air stream.

20. The method as defined in claim 17 wherein the step of generating an air stream having an uncontrolled warm and moist environment and passing said air stream across said access opening further includes the steps of:

providing a fan;

rotating said fan with a motor;

drawing air into an intake opening with said fan to generate said air stream having an uncontrolled warm and moist environment;

directing said air stream through a narrowing air duct and out a slot orifice;

moving said air stream across said access opening; and collecting said air stream at said access opening.

* * * * *

UNITED STATES PATENT AND TRADEMARK OFFICE
CERTIFICATE OF CORRECTION

PATENT NO. : 5,532,456
DATED : July 2, 1996
INVENTOR(S) : Wayne W. Smith; Thomas J. Frick; Earl H. Moore It is certified that error appears in the above-indentified patent and that said Letters Patent is hereby corrected as shown below:

Column 1, line 33, after "to" insert -- be --.

Column 1, line 49, "abovementioned" should be -- above-mentioned --.

Column 3, line 11, "form" should be -- from --.

Column 4, line 12, "controllable" should be -- controllably --.

Column 4, line 32, "preferable" should be -- preferably --.

Column 4, line 34, "prob" should be -- probe --.

Column 6, line 19, "controllable" should be -- controllably --.

Column 7, line 13, "Warm" should be -- warm --.

Column 7, line 29, "controllable" should be -- controllably --.

UNITED STATES PATENT AND TRADEMARK OFFICE
CERTIFICATE OF CORRECTION

PATENT NO. : 5,532,456
DATED : July 2, 1996
INVENTOR(S) : Wayne W. Smith; Thomas J. Frick; Earl H. Moore It is certified that error appears in the above-indentified patent and that said Letters Patent is hereby corrected as shown below:

Column 7, line 32, "controllable" should be -- controllably --.

Column 7, line 38, "controllable" should be -- controllably --.

Column 7, line 42, "controllable" should be -- controllably --.

Column 8, line 26, "controllable" should be -- controllably --.

Signed and Sealed this

Twenty-first Day of January, 1997

Attest:

BRUCE LEHMAN

*Attesting Officer*     *Commissioner of Patents and Trademarks*